United States Patent [19]

Dunaway

[11] Patent Number: 4,678,517
[45] Date of Patent: Jul. 7, 1987

[54] METHOD FOR CALCINING KAOLIN

[75] Inventor: Weyman H. Dunaway, Sandersville, Ga.

[73] Assignee: E.C.C. America Inc., Atlanta, Ga.

[21] Appl. No.: 890,151

[22] Filed: Jul. 25, 1986

[51] Int. Cl.$^4$ .............................................. C04B 14/00
[52] U.S. Cl. ................................ 106/309; 106/288 B; 106/308 B; 106/308 C; 106/308 Q
[58] Field of Search ........... 106/288 B, 308 B, 308 C, 106/308 Q, 309; 423/111

[56] References Cited

U.S. PATENT DOCUMENTS

| | | | |
|---|---|---|---|
| 3,014,836 | 12/1961 | Proctor, Jr. ...................... | 106/288 B |
| 3,171,718 | 3/1965 | Gienn et al. ...................... | 106/288 B |
| 3,383,438 | 5/1968 | Allegrini et al. .................. | 106/288 B |
| 3,519,453 | 7/1970 | Morris et al. ...................... | 106/288 B |
| 3,586,523 | 6/1971 | Fanselow et al. ................. | 106/288 B |
| 3,798,044 | 3/1974 | Whitley et al. .................. | 106/288 B |
| 3,941,872 | 3/1976 | Puskar ............................ | 106/288 B |
| 3,993,500 | 11/1976 | Isaac et al. ...................... | 106/288 B |
| 4,381,948 | 5/1983 | McConnell et al. ............. | 106/288 B |

Primary Examiner—Paul Lieberman
Assistant Examiner—Willie J. Thompson
Attorney, Agent, or Firm—Stefan J. Klauber

[57] ABSTRACT

A method for improving brightness in a calcined kaolin pigment while minimizing detrimental effects on abrasiveness. The kaolin calciner feed is intermixed with a particulate material which is oxidizable during calcining to provide a source of auxiliary thermal energy in the kaolin bed; and the mixture is calcined at a temperature in the range of about 900° C., but below about 1100° C., and in the presence of an oxidizing atmosphere throughout the calcining step.

12 Claims, 2 Drawing Figures

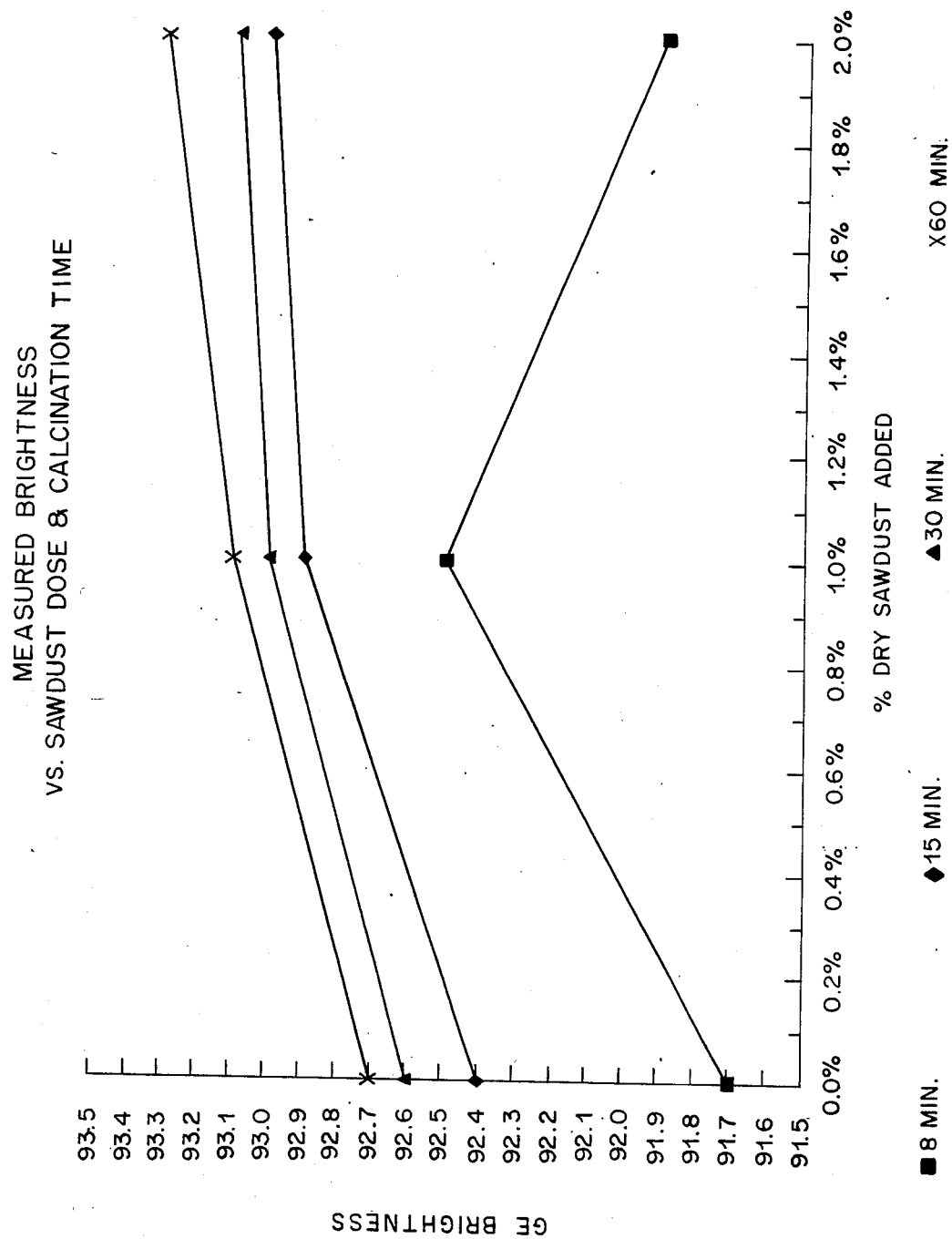

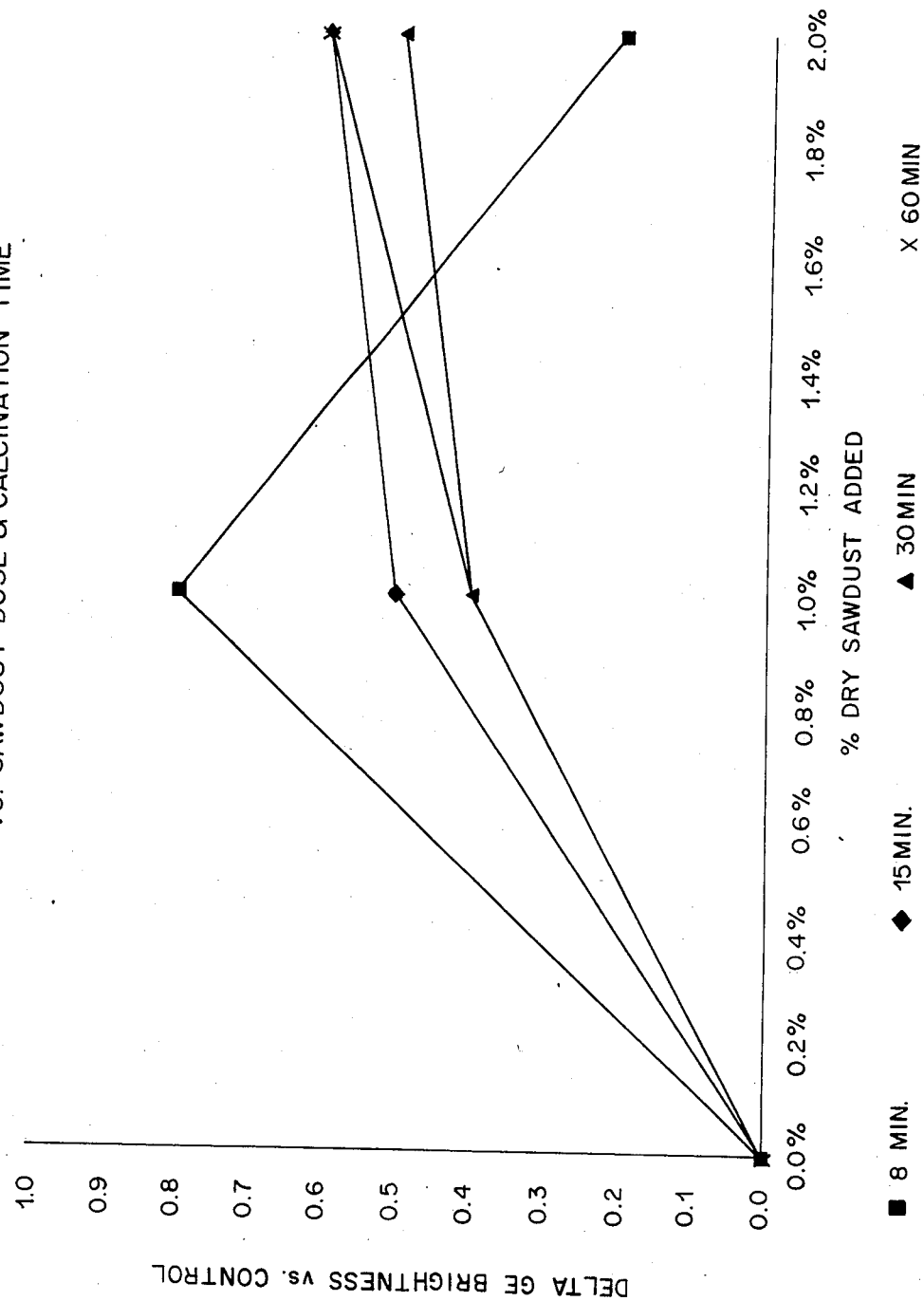

METHOD FOR CALCINING KAOLIN

FIELD OF THE INVENTION

This invention relates generally to the production of calcined kaolin pigments, and more specifically relates to a method for producing higher brightness or lower abrasiveness calcined kaolins. Such materials are particularly useful as fillers and coating pigments for paper and paperboard products.

BACKGROUND OF THE INVENTION

In the course of manufacturing paper and similar products, including paperboard and the like, it is well-known to incorporate quantities of inorganic materials into the fibrous web in order to improve the quality of the resulting product. In the absence of such "fillers", the resultant paper can have a relatively poor texture due to discontinuities in the fibrous web. The said fillers are also important in improving the printing qualities of the paper, i.e. by improving the surface characteristics of same. The use of appropriate such fillers further, vastly improves the opacity and the brightness of a paper sheet of a given weight.

Among the materials which have thus found increasing acceptance as paper fillers are calcined kaolin clays. Materials of this type are generally prepared by calcining a crude kaolin, which may have been initially subjected to prior beneficiation steps in order to remove certain impurities, e.g. for the purpose of improving brightness in the ultimate product. Reference may be usefully had to U.S. Pat. Nos. 3,014,836, to Proctor and 3,586,523, to Fanselow, which disclosures are representative of the prior art pertinent to the present invention.

Those properties which render a calcined kaolin pigment particularly valuable for use as a filler are also well known. These include a low abrasion value, and high brightness and opacifying characteristics. The low abrasion is significant in order to assure that the resultant paper product may be manufactured and processed using conventional machinery without damaging same. The brightness and opacifying characteristics are important in producing an acceptable paper sheet, one which incorporates whiteness, high opacity, good printability and light weight.

In addition to their use as fillers, calcined kaolin pigments have also found increasing application as paper coating pigments, wherein the characteristics of brightness and low abrasiveness remain of paramount importance.

The general relationship between calcining temperature and product brightness and abrasiveness is detailed in U.S. Pat. No. 3,519,453 to Morris et al which discloses in FIG. 3 that, as the calcining temperature was increased from about 1400° F. to about 1800° F. (760° to 982° C.), the G.E. brightness of the product increased about eight percentage points, and the abrasiveness approximately doubled.

Advantages of the present method are that it permits the production of higher brightness calcined kaolins, or of lower abrasiveness calcined kaolins, or it eliminates some of the beneficiation steps which must otherwise be applied to the feed to the calciner. Additionally, it permits the calcining treatment to be carried out at shorter residence times than previously used in the art, which is an advantage since the shorter the time of treatment, the lower the unit cost.

U.S. Pat. No. 3,586,523 to Fanselow et al teaches the significance of the purification or refining of the feed to the calciner, as in the Example where the crude kaolin is initially beneficiated by froth flotation, bleached with an oxidizing agent (potassium permanganate) and a reducing agent (zinc hydrosulfite), reference being made by the patentee in such respect to U.S. Pat. No. 3,353,668 to Duke. Such processing in Duke increased the G.E. brightness of the gray kaolin described therein from an initial value of 78% to a final brightness of 90.2% (refer to Example IV, the preferred embodiment).

U.S. Pat. No. 3,798,044 to Whitley et al discloses subjecting the calciner feed to a high intensity magnetic field, thereby removing magnetically susceptible contaminants, mainly iron and titanium minerals.

U.S. Pat. Nos. 3,014,836 to Proctor; 3,586,523 to Fanselow et al; and 4,381,948 to McConnell et al, disclose inter alia the importance, relative to the brightness and abrasiveness of the product, of the fineness of the feed to the calciner. These patentees achieved the desired fineness by fractionating the crude clay or by selecting a feed crude which is very fine to begin with. U.S. Pat. Nos. 3,171,718 to Gunn et al, and 3,798,044 to Whitley et al disclose delaminating the kaolin feed in order to achieve fine particle size feed.

U.S. Pat. No. 3,383,438 to Allegrini et al discloses burning the fuel in an external chamber of a rotary furnace, i.e. with a shielded flame, and admitting the resulting hot combustion gases to the calciner thereby eliminating the formation of vitreous particles which otherwise increase the abrasiveness of the calcined product. In effect the calciner is a convection section of a furnace.

As is known, calcination of kaolin clays may be carried out at temperatures above about 842° F. (450° C.), for example above 1652° F. (900° C.) but below 2012° F. (1100° C.)—to avoid the formation of crystalline abrasive mullite—e.g. at about 1850° F. (1010° C.) to about 1925° F. (1052° C.). The heating is carried out for a period which eliminates the hydroxyl groups of the kaolinite structure, and the crystalline structure of the kaolinite is destroyed. During calcination, the kaolin undergoes a well-defined endothermic reaction associated with dehydroxylation (also referred to as loss of water) when the clay temperature reaches about 1350° F. (732° C.). This results in a material usually referred to as metakaolin. If the clay temperature is further increased, the metakaolin undergoes a characteristic exothermic reaction at about 1800° F. (982° C.).

U.S. Pat. No. 3,941,872 to Puskar, discloses the sequential heating of a kaolin feed: first heating under a reducing atmosphere to a temperature in the range of 1400° F. to 2200° F., and thereafter heating the kaolin in, as termed by the patentee, "a conventional oxidizing atmosphere" to a temperature at least as high as the temperature to which it had been heated under a reducing atmosphere. Such sequential heating produced a product of higher brightness or of lower abrasiveness than was achieved when the oxidizing atmosphere was used throughout. The only enabling disclosure provided concerns heating a clay in the presence of carbon, employing an electrically heated muffle furnace and restricting access of air to some of the trays in the tests by closing those trays, thereby to provide a reducing atmosphere. Standard furnaces are usually direct-fired in that the burner combustion gases circulate directly over the charge; occasionally the flame may be permitted to impinge on the charge. Common examples are rotary kilns and open-hearth furnaces. On the other hand, muffle-type furnaces are frequently employed when the charge requires special atmospheres, see *Chemical Engineers' Handbook*, Perry and Chilton, McGraw-Hill, Fifth Edition, 9-33, 20-26. Puskar discloses that the carbon may be present as an additive. Alternatively, at least a portion of the carbon may be an indigenous impurity in the clay. Domestic (Georgia) gray kaolin is given as an example of a carbon-contaminated clay which may be used without supplementary addition of carbon in the practice of the preferred embodiment, see column 2, lines 54-61. It may be noted that an earlier patent, U.S. Pat. No. 3,586,523 to Fanselow et al discloses the calcination of "gray" kaolin by conventional methods, i.e. in an oxidizing atmosphere. Also, U.S. Pat. No. 4,034,058 to Jameson et al discloses a process of chlorinating calcined kaolin in which carbon optionally is added to the clay during chlorination at elevated temperatures to facilitate the formation of a volatile iron chloride.

Since Puskar requires a reducing ambient gas for the first stage of a two-stage calcination, it is worthwhile to consider whether the method is practicable for commercial operation.

In general, a furnace that obtains its energy by burning fuel, e.g. a hydrocarbon such as oil or, preferably, a gas fuel, operates with excess air, see U.S. Pat. No. 4,321,130, Example 1, column 6, lines 43-46, where it is shown that the stack excess air is 10% over stoichiometric for completely burning the fuel gas and see column 8, line 15, where a system using 15% excess air is noted. U.S. Pat. No. 4,332,546 describes a gas seal for a furnace using gas turbine exhaust and make-up air flow as combustion air. The events following a gas turbine trip are illustrated in FIG. 6 and described at column 7 lines 46-58, where it is shown that the minimum total air flow to the furnace remains above stoichiometric requirements at all times. It is stated at column 1, lines 54-64, that in the event that a gas turbine trips, one concern is that the furnace may become starved for oxygen temporarily. The resulting build-up of a high concentration of hydrogen or hydrocarbons in the furnace atmosphere followed by a sudden surge of oxygen, has the potential for causing an explosion and fire. Thus, a furnace can be operated safely with an excess of oxygen over the stoichiometric amount needed to react completely with the fuel. It therefore appears that a furnace burning a mixture of air and fuel is not amenable to providing a flue gas which is a reducing atmosphere having a deficiency of oxygen, i.e. excess fuel, but rather provides an oxidizing atmosphere. Neither is it suitable for supplying sequentially a reducing and then an oxidizing atmosphere. However, such furnaces, in particular wherein the flue gas is in direct contact with the charge, are highly desirable for calcining kaolin. One example is the rotary calciner in which the flame is shielded, of Allegrini et al, supra. Another preferred type is the multiple-hearth furnace known under various names, e.g. Herreschoff.

In a general design of a multiple-hearth furnace as described in Perry and Chilton, Ibid, 20-48, 49, a number of annular-shaped hearths are provided, one above the other. There are rabble arms on each hearth driven from a common center shaft. The feed is charged at the center of the upper hearth, the arms move the charge outward to the periphery where it falls to the next hearth, here it is moved again to the center and the procedure is repeated down the furnace. The hollow center shaft is cooled internally by forced-air circulation. Burners may be mounted at any of the hearths and the circulated air is used for combustion of the fuel. These furnaces handle granular material, thus are highly suitable for calcining kaolin in particulate form, and provide a long countercurrent path between the flue gas and the charge material.

SUMMARY OF THE INVENTION

It has now been found that a calcined kaolin of higher brightness or of lower abrasiveness may be produced by a simple method which does not require modification of the calciner. Standard furnaces (such as a Herreschoff) may be used. It is not necessary to modify the kiln to permit the use of sequential atmospheres. The calcining is carried out in a conventional oxidizing atmosphere.

According to the present invention, a particulate source of thermal energy is distributed throughout the bed of the kaolin within the calciner by mixing the said particulate material with the kaolin feed prior to calcining. Such particulate material will normally comprise an oxidizable substance, typically a combustible organic such as a hydrocarbon or a carbohydrate. Wood sawdust has been found to be a particularly preferred material for this use. The particulate material is mixed with the kaolin feed to the calciner in a minor amount, such as from about 0.5 to about 2% by weight of the mixture, after which the mixture is calcined under a conventional oxidizing atmosphere such as results when excess air is provided to the fuel burners which heat the calciner.

The particulate additive can be present in amounts greater than about 2% (e.g. 4% or more), but little further advantage is achieved by the higher amounts. Where a low abrasion fully calcined product is the end objective of the process, calcination temperatures as described in the McConnell et al U.S. Pat. No. 4,381,948 are preferably used, i.e. above 900° C., but below about 1100°C.

The aforementioned sawdust material has been found to be particularly advantageous for use in the invention as compared, for example, to charcoal or other forms of powdered carbon. While applicant does not wish to be bound by any particular theory of the invention, it is hypothesized that the preferred sawdust may be advantageous, in part in that the moisture present in this natural product may serve to delay combustion until higher temperatures are achieved in the vicinity of the additive, thereby rendering the additive particularly efficacious.

The invention is applicable to all feeds that are customarily utilized in preparing calcined kaolins, including the so-called "gray" kaolins which are described in the Fanselow patent, U.S. Pat. No. 3,586,523, or the various other fine calciner feeds, which are not necessarily derived from gray crudes, as are described in many of the further references aforementioned.

In a study of the invention, it was observed that the presence of sawdust greatly decreases the residence time required to reach a given brightness. It is believed that this may be due to the sawdust acting as a heat generating/heat transfer agent. That is, it is combustible and provides additional heat which is generated in situ within the bed to heat the kaolin.

This also serves to coarsen the particle size, apparently as a result of sintering. Because of better sintering and corresponding reduction in fines, the product pigment exhibits decreased gloss and improved light scattering in paper applications.

Thus the product is useful as a filler or coating pigment for paper, where the increased brightness is advantageous, but in addition an unexpected advantage is obtained, i.e. a decrease in gloss. This is an advantage for paint and rubber pigment grades of kaolin since they are often used for flat paints, etc.

laboratory calciner at 1975° F. The results set forth in Table I include data for residence times of 8, 15 and 30 and 60 minutes, and for sawdust addition levels of 1.0, 2.0, and 4.0% by weight, as well as for the (control) case where the additive is not used. The sawdust in each instance was added in its natural state, but the quantities in the Table are shown on a dry basis.

TABLE I

| Calciner Time | Sawdust Dose Rate | | | |
|---|---|---|---|---|
| | 0% (control) | 1% | 2.0% | 4.0% |
| 8 min | 91.7 ± 0.3(3) | 92.5 ± 0.3(3) | 91.9 ± 1.2(3) | 84.3 ± 7.3(3) |
| 15 | 92.4 ± 0.1(3) | 92.9 ± 0.1(3) | 93.0 ± 0.1(3) | 92.9 ± 0.1(3) |
| 30 | 92.6 ± 0.2(3) | 93.0 ± 0.2(3) | 93.1 ± 0.3(3) | 93.1 ± 0.1(3) |
| 60 | 92.7 ± 0.2(2) | 93.1 ± 0.1(2) | 93.3 ± 0.2(2) | 93.3 ± 0.2(2) |

BRIEF DESCRIPTION OF DRAWINGS

In the drawings appended hereto:

FIG. 1 is a graph depicting resulting brightness in calcined kaolins as a function of dosage level and calcination time for samples subjected to processing in accordance with the invention; and FIG. 2 is a graph similar to FIG. 1, except plotting the brightness benefits achieved as a function of the said dosage level and calcination time for samples of kaolins processed pursuant to the invention.

DETAILED DESCRIPTION

Example I

The runs shown in Table I were carried out in a laboratory calciner which was an electric furnace manufactured by the Harrop Precision Furnace Co. of Columbus, Ohio, Model No. NMR-12-44320-2700. The furnace was open to the atmosphere as it was not hermetically sealed, viz., there were no gaskets between the refractory door and metal frame, thus there was just metal to refractory contact and no means of preventing in leakage of air. The furnace door was kept closed during the tests in order to maintain the temperature at 1975° F. (1080° C.). The kaolin samples were mixed with the sawdust so as to distribute the sawdust thoroughly throughout the sample. The samples were placed in shallow, tapered cups and loaded into the furnace. The cups were left open to provide an oxidizing atmosphere.

The kaolin samples subjected to the tests derived from two different crudes. Samples A were thus derived from a fine "gray" crude characterized in having approximately 80% by weight of the particles thereof of less than 1 micrometer E.S.D. Samples B were derived from a coarser, soft cream kaolin crude, in which 50 to 60% by weight of the particles were of less than 1 micrometer E.S.D. (equivalent spherical diameter). The samples, taken from a plant calciner feed, had been beneficiated by the procedures described in McConnell et al, U.S. Pat. No. 4,381,948. Samples A as thus beneficiated were at least 98% by weight less than 1 micrometer E.S.D. Samples B were of at least 95% by weight less than 1 micrometer E.S.D.

In Table I, the brightness values shown are the averages for the number of runs indicated in parentheses. Where three runs are shown, one was carried out with Sample A kaolin and two with Sample B kaolin; and where two runs are shown, only the latter was used.

The effects of calciner residence time and sawdust dose rate for the said samples were evaluated in the The data set forth in Table I are shown graphically in FIGS. 1 and 2, except that the data for the 4% addition is not shown, since a much enlarged platen or scale change is needed to accommodate same. These graphs (and the data of Table I) clearly demonstrate the improvement in brightness with the use of sawdust during calcination in an oxidizing atmosphere throughout the calcination. In general, the addition of the sawdust increased brightness 0.4 to 0.8 units—which is most surprising, since the samples were calcined in an oxidizing atmosphere.

The 0.5–0.8 unit brightness benefits at 1% sawdust and 8–15 minutes residence time are of particular interest, since this indicates that the sawdust may in part be providing a source of heat from within the clay, thereby overcoming heat transfer limitations of shorter residence times. While it is seen that the benefits of the invention are fully achieved at the higher residence times, e.g. at 60 minutes, it will be evident that reducing the residence time in a calciner serves to increase production capacity without increasing capital investment.

Example II

Brightness and abrasions were determined for a series of kaolin plant calciner feed samples of the types A and B described in Example I. The results are set forth in Table II below, from which it will be seen that the addition of 1% sawdust increased brightness for 0.4 to 0.9 units without any significant effect on abrasion.

TABLE II

| Calcination Time | Brightness | | Breunig Abrasion[1] | |
|---|---|---|---|---|
| | 0% | 1% | 0% | 1% |
| 8 min. | 92.3 ± 0.3(4) | 93.2 ± 0.3(4) | 58 ± 8(6) | 57 ± 6(6) |
| 30 min. | 93.1 ± 0.3(5) | 93.5 ± 0.3(5) | 70 ± 12(7) | 74 ± 16(7) |

[1]Breunig Abrasion is determined by use of the Einlehner Abrasion Tester Model AT1000 of Einlehner A.G. (West Germany). The test procedure is as follows:
The Einlehner phosphor bronze abrasion wire is prepared by thoroughly washing the wire in water, rinsing the wire with acetone, ultrasonically cleaning the wire in acetone for 30 seconds; drying to constant weight in a laboratory oven at 60° C. (Usually a drying time of 15 minutes is sufficient); allowing the wire to cool in a desicator; and weighing the wire to four places of decimals. After cleaning, the wire must not be touched with bare fingers prior to weighing.
The sample is dispersed in water using a laboratory stirrer. The dispersed material is screened through a 105 micron sieve and the concentration of the slurry adjusted to 10.0% wt./vol. The pH of the slurry is measured and reported.
The previously prepared wire is fitted into the base of the vessel ensuring that the neoprene rubber disc is in place between the wire and the base plate and that the wearing surface is uppermost. 1000 cm$^3$ of previously prepared slurry

TABLE II-continued is added to the vessel. The abrader head is fitted into its holder and it is ensured that a fresh P.V.C. surface is lowermost. The spindle is raised and the vessel placed in its loading recess, and the spindle is then lowered until the abrader rests on the wire disc. The test duration time is set to 43,500 revolutions and the run started. At the end of the run the wire disc is recorded and cleaned, dried and weighed as above. The weight loss of the worn disc is recorded, and this weight is quoted as the Einlehner abrasion value (E). To convert the value E to Breunig value B, as in the Table, the formula $B = 11.3 E - 2.3$, is used.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, tne invention is to be broadly construed, and limited only by the scope and spirit of the claims now appended hereto.

What is claimed is:

1. A method for improving brightness in a calcined kaolin pigment while minimizing detrimental effects on abrasiveness; comprising: intermixing with a kaolin calciner feed a particulate material which is oxidizable during calcining to provide a source of auxiliary thermal energy in the kaolin bed; and calcining the mixture at a temperature in the range of above 900° C., but below about 1100° C., in the presence of an oxidizing atmosphere throughout the calcining step.

2. A method in accordance with claim 1, wherein the calcination period is from about 8 to 60 minutes.

3. A method in accordance with claim 1 in which the particulate material is present in a minor amount in the range of about 0.5 to about 2% by weight of the mixture.

4. A method in accordance with claim 3, in which the particulate material is a carbohydrate.

5. A method in accordance with claim 3, in which the particulate material is a hydrocarbon.

6. A method in accordance with claim 3, in which the particulate material is sawdust.

7. A method in accordance with claim 6 in which the calcination period is less than 60 minutes.

8. A method in accordance with claim 6, in which the calcination period is from 8 to 15 minutes.

9. A method in accordance with claim 1 in which the calciner is energized by burning fuel, and the flue gas contacts the kaolin.

10. A method in accordance with claim 9 in which the fuel is a gas.

11. A method in accordance with claim 1 in which a multiple-hearth kiln is used.

12. A method in accordance with claim 11 in which a Herreschoff kiln is used.

* * * * *